United States Patent
Moghtaderi et al.

(10) Patent No.: US 10,445,644 B2
(45) Date of Patent: Oct. 15, 2019

(54) ANOMALY DETECTION FOR NON-STATIONARY DATA

(71) Applicant: eBay Inc., San Jose, CA (US)

(72) Inventors: Azadeh Moghtaderi, San Jose, CA (US); Gagan Singh Bawa, Campbell, CA (US); David Schwarzbach, San Jose, CA (US)

(73) Assignee: eBay Inc., San Jose, CA (US)

( * ) Notice: Subject to any disclaimer, the term of this patent is extended or adjusted under 35 U.S.C. 154(b) by 483 days.

(21) Appl. No.: 14/588,355

(22) Filed: Dec. 31, 2014

(65) Prior Publication Data

US 2016/0189041 A1    Jun. 30, 2016

(51) Int. Cl.
  *G06F 15/18*   (2006.01)
  *G06N 5/04*    (2006.01)
  *G06N 20/00*   (2019.01)

(52) U.S. Cl.
  CPC ............. *G06N 5/04* (2013.01); *G06N 20/00* (2019.01)

(58) Field of Classification Search
  None
  See application file for complete search history.

(56) References Cited

U.S. PATENT DOCUMENTS

| | | |
|---|---|---|
| 5,938,501 A | 8/1999 | Gerding et al. |
| 7,251,589 B1 | 7/2007 | Crowe |
| 2002/0169657 A1 | 11/2002 | Singh et al. |
| 2003/0033094 A1 | 2/2003 | Huang |
| 2003/0220740 A1* | 11/2003 | Intriligator ............ G01W 1/10 702/3 |
| 2010/0138919 A1* | 6/2010 | Peng ................. H04L 29/12009 709/224 |
| 2016/0140584 A1 | 5/2016 | Moghtaderi |
| 2017/0372207 A1 | 12/2017 | Moghtaderi |

FOREIGN PATENT DOCUMENTS

| | | |
|---|---|---|
| WO | WO-2016018123 A2 | 5/2016 |
| WO | WO-2016081231 A3 | 5/2016 |

OTHER PUBLICATIONS

"International Application Serial No. PCT/US2015/060072, International Search Report mailed May 16, 2016", 2 pgs.

(Continued)

*Primary Examiner* — Luis A Sitiriche
(74) *Attorney, Agent, or Firm* — Schwegman Lundberg & Woessner, P.A.

(57) ABSTRACT

A method of detecting anomalies in a time series is disclosed. A training time series corresponding to a process is extracted from an initial time series corresponding to the process, the training time series including a subset of the initial time series. Outlier data points in the training time series are modified based on predetermined acceptability criteria. A plurality of prediction methods are trained using the training time series. An actual data point corresponding to the initial time series is received. The plurality of prediction methods are used to determine a set of predicted data points corresponding to the actual data point. It is determined whether the actual data point is anomalous based on a calculation of whether each of the set of predicted data points is statistically different from the actual data point.

19 Claims, 7 Drawing Sheets

(56) References Cited

OTHER PUBLICATIONS

"International Application Serial No. PCT/US2015/060072, Written Opinion mailed May 16, 2016", 5 pgs.

Bhansali, R.J., "Asymptotic Properties of the Wiener-Kolmogorov Predictor", Part 1—Journal of the Royal Statistical Society. Series B (Methodological), vol. 36, No. 1, (1974), 61-73.

Huang, Norden E., et al., "The empirical mode decomposition and the Hilbert spectrum for nonlinear and non-stationary time series analysis", Proceedings of the Royal Society of London A, 454, (1996), 96 pgs.

Thomson, David J., "Spectrum estimation and harmonic analysis", Proceedings of the IEEE, 70, (Sep. 1982), 1055- 1096.

Moghtaderi, Azadeh et al, "Trend Filtering: Empirical Mode Decompositions Versus 1x and Hodrick-Prescott", Advances in Adaptive Data Analysis vol. 3, Nos. 1 & 2 (2011) 41-61.

"International Application Serial No. PCT US2015 060072, International Preliminary Report on Patentability dated Jun. 1, 2017", 7 pgs.

\* cited by examiner

ANOMALY DETECTION FOR NON-STATIONARY DATA

TECHNICAL FIELD

The present application relates generally to the technical field of data processing, and, in one specific example, to detecting anomalies in time series data corresponding to processes executing on one or more servers.

BACKGROUND

Various computer systems, such as electronic commerce (e-commerce) systems or network-based publication systems (e.g., eBay, Amazon, or Craigslist), which facilitate exchanges of items (e.g., goods or services) between users, may include many (e.g., millions or billions) of processes executing on one or more servers. Each of these processes may have one or more data inputs and one or more data outputs. Furthermore, input and output data in such systems may be non-stationary data. For example, data generated by a set of processes for a first locale may have statistical properties that vary from data generated by the same set of processes for a second locale. Given the complexity of such systems, determining their overall health may be well outside the purview of human operators.

BRIEF DESCRIPTION OF THE DRAWINGS

Some embodiments are illustrated by way of example and not limitation in the figures of the accompanying drawings.

DETAILED DESCRIPTION

Figure 1:
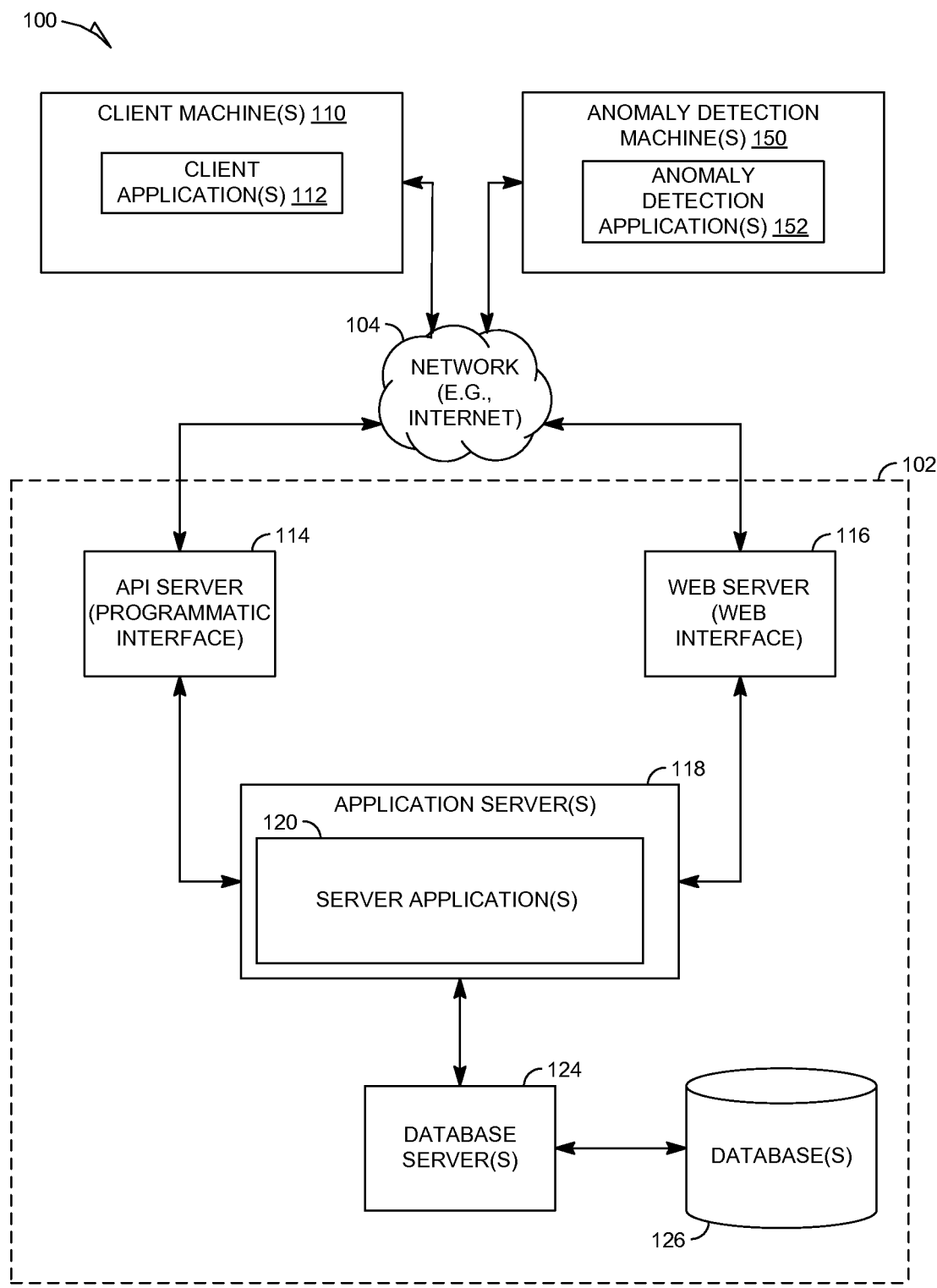
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

An electronic commerce system may be a complex system having input-output behavior that is difficult to quantify. However, the overall health of the system can be quantified at least in the sense that the overall health is reflected by the output of the system's data-generating processes. In other words, the health of a complex system may be reflected by the data it generates. For example, various facets of system health may be reflected by data (e.g., time series data) corresponding to various data categories, such as the financial, behavioral, clickstream-derived, and server-derived categories. For example, it is not hard to imagine that broad-impact events, such as a change to Google's SEO algorithm, may affect data in many, if not all, categories of data of an electronic commerce system. On the other hand, events with a narrower impact, such as code bugs or targeted cyber-attacks, may only affect data belonging to a specific category of data. Regardless of the scope of the impact, anomalies in system health are manifested in data. Such anomalies may be of a positive (business-enhancing) or negative (business-degrading) nature.

Detecting anomalies in system health may be the first step towards attenuating their negative business impact, stimulating their positive business impact, and understanding their underlying root causes. To this end, an anomaly detection system may continuously monitor data produced by each of the system's data-generating processes.

In some embodiments, an e-commerce system has billions of data-generating processes. Working with such a large quantity of data sets may be outside of the purview of human operators, which raises the need for automation. Further, any process that continuously monitors billions of data sets should have an implementation that is massively scalable. More subtly, the data-generating processes themselves may produce data with diverse characteristics; this issue raises the need for anomaly detection algorithms which are data-adaptive. Thus, the back-end of an anomaly-detection system must be driven by an anomaly detection algorithm that is automated, massively scalable, and data-adaptive.

To make the notion of an anomaly more precise, we first define what it means for the system to be in normal health. To this end, we make the following operational definition: The system is in normal health if each of its data-generating processes is in a state of statistical equilibrium. Under this definition, an anomaly is a deviation of one of the system's data-generating processes from statistical equilibrium. In practice, an anomaly in a particular data-generating process will be evident from the data it generates.

As indicated above, the anomaly-detection system should be data-adaptive. A challenge to devising such a system is that the data-adaptation may need to occur within a given data set, not just across multiple data sets. For example, a given data set may have statistical properties that vary across local time regimes. In this case, we say that the data (and its corresponding data-generating process) is non-stationary. Non-stationarity complicates our approach to anomaly detection, since the notion of "statistical equilibrium" must also be time-adaptive. The anomaly-detection system is designed to seamlessly handle non-stationarity by integrating data from multiple local time regimes.

In various embodiments, the anomaly-detection system is, fundamentally, a statistical test for anomalies. In the statistical realm, there must be a threshold set that describes the amount of expected false anomaly detections. The anomaly-detection system is designed to minimize the number of expected false anomaly detections (e.g., by combining data from a battery of different prediction algorithms).

A method of detecting anomalies in a time series is disclosed. A training time series corresponding to a process is extracted from the initial time series. Outlying data points in the training time series are modified based on predetermined acceptability criteria. A plurality of prediction methods are trained using the training time series and predictions (e.g., one-step-ahead predictions) are obtained using the estimated parameters for each prediction method. Prediction errors are then computed. It is determined whether a data point is anomalous based on a determination of whether the corresponding prediction error is statistically different than the immediate prediction error history of a given length relative to that data point. The final determination is based on a combination of the information from the plurality of prediction methods.

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may access the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
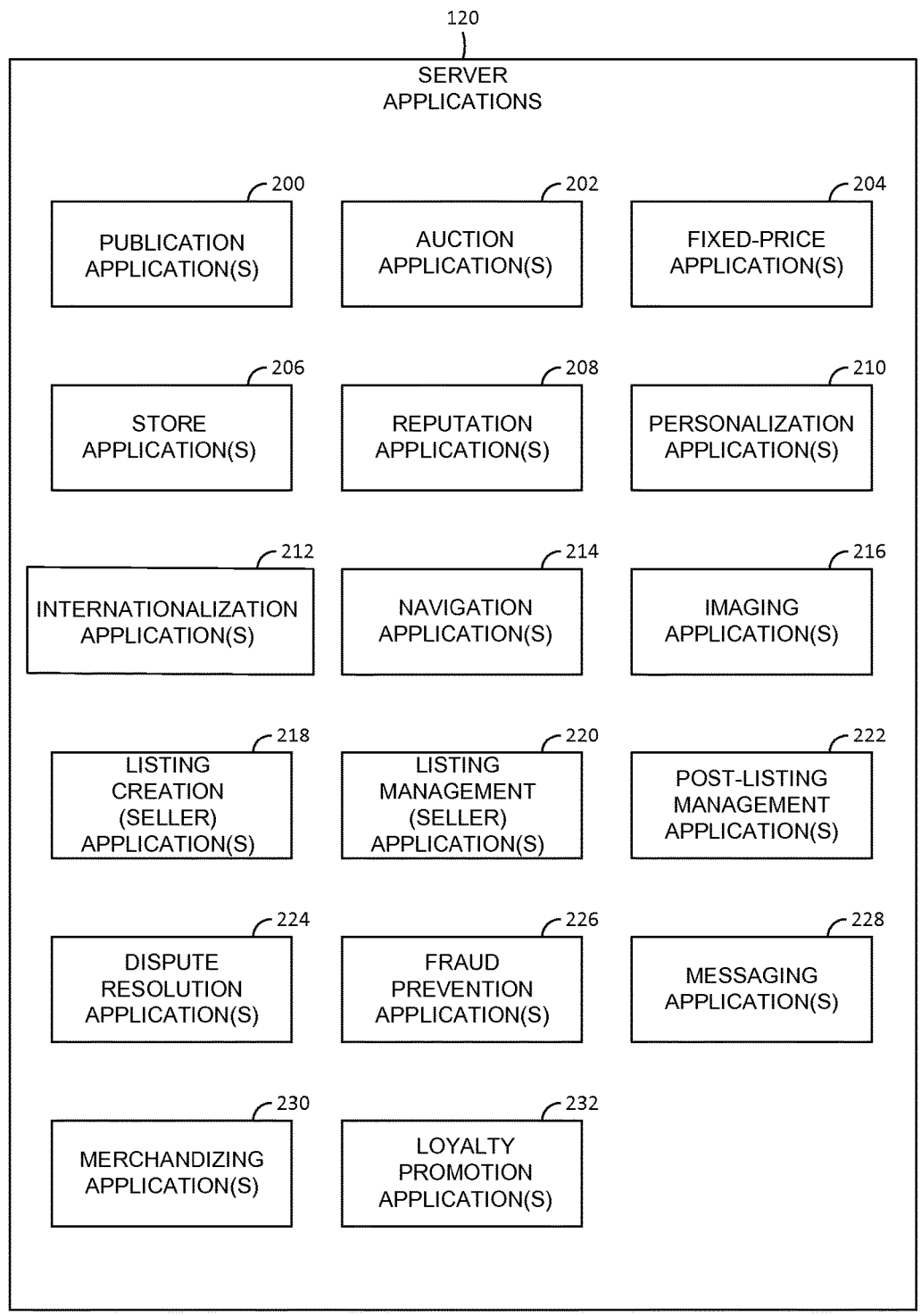
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and thereby to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Each of the server application(s) 120 may be associated with one or more computer processes, each having one or more sets of output data. One or more anomaly detection application(s) 152 executing on or more anomaly detection machine(s) 150 may be configured to detect anomalies in the system 100, as described in more detail below.

Figure 3:
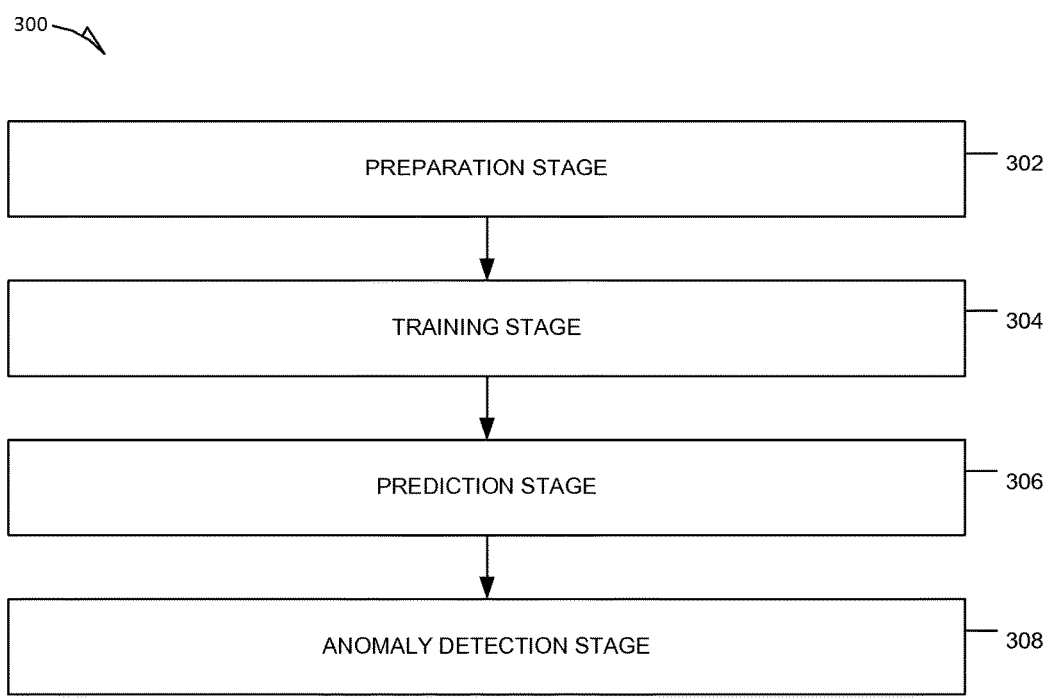
FIG. 3 is an example embodiment of a method of determining a health of a complex system.

FIG. 3 is an example embodiment of a method 300 of determining a health of a system, such as the system 100 of FIG. 1. In various embodiments, the method 300 may be implemented by one or more of the anomaly detection application(s) 152. In various embodiments, the method implements a framework for detecting anomalies in time series data.

In various embodiments, the method 300 may process one or a multitude of time series such that it processes one of such time series at a time for one time point. The method 300 can then be repeated for every time point within a time duration of interest, in order, from the farthest time point to the latest. While processing a time series S (e.g., an initial time series) for time point t, at 302, the preparatory stage is concerned with data preprocessing. A training time series corresponding to a predetermined or particular data-generating process is received such that this training time series, say T, of length n where n is smaller than t, contains data elements from S corresponding to time points from (t-n) to (t-1) in the initial time series. In various embodiments, the training time series may be further modified by implementing a process to ensure that the time series T adheres to specific predetermined standards.

At operation 304, the training stage operates using data contained in the time series T. In various embodiments, this stage selects locally optimal parameters for each of a prescribed set of prediction methods (e.g., one-step prediction methods). In this way, the training stage is used to assess certain statistical properties for each member of the set of the prediction methods specifically based on the time series T selected during operation 302 corresponding to the time point t of interest.

At operation 306, the prediction stage functions use the locally optimal statistical properties generated in operation 304 for each member of the set of prediction methods to generate predictions (e.g., one-step ahead predictions) for each member of the set of prediction methods corresponding to time point t for the time series S.

At operation 308, the anomaly detection stage identifies a potential anomaly in time series S at time point t. The actual (measured) data at time point t is compared with the predictions from operation 306 and a statistical test is applied to the differences between the predicted and actual data. The results of this test are used to flag the data at time point t as anomalous or not. Overall, this procedure is consistent with the intuitive notion that anomalies are "unpredictable" and it is able to identify when the underlying data-generating processes are operating outside of their usual state.

Figure 4:
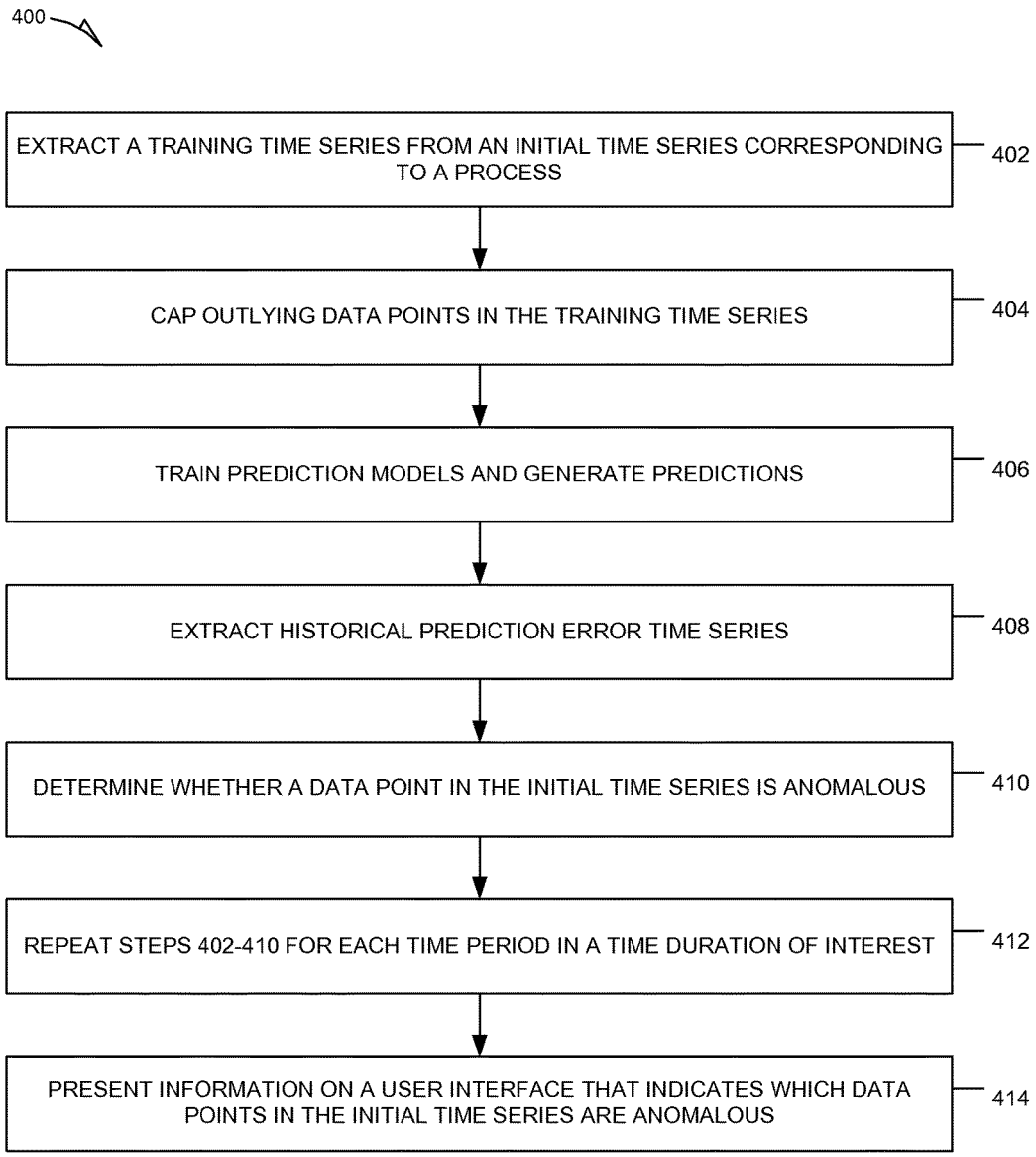
FIG. 4 is an example embodiment of a method of detecting anomalies with respect to a computer process executing within a complex system.

FIG. 4 is an example embodiment of a method 400 of detecting anomalies with respect to a complex system, such as the system 100 of FIG. 1. In various embodiments, the method 400 may be implemented by one or more of the anomaly detection application(s) 152.

In this embodiment, the method 400 is implemented such that it is executed for each time series of interest and for the entire time duration of interest, one time point at a time. For example, suppose that the data given is a time series S, indexed from time point 1 to M, and comprised of observations $X(1), X(2), \ldots, X(M)$. Also, assume the time duration of interest is from time point P to time point M (the end). So, the anomaly detection process starts with time point P.

At operation 402, a training time series T of training length N is extracted from S such that it contains data elements from time point (P-N) to time point (P-1). In various embodiments, it is assumed that N is significantly less than M.

At operation 404, outlying data points in the time series T are capped. For example, data pre-processing operations may be applied to the training time series to bring identified outliers to within the values of other data values.

At operation 406, the training time series T is used to generate the parameters for each of a plurality of prediction methods. For example, the following steps may be performed: using the training time series T to estimate the parameters of each of q different pre-selected prediction methods (e.g., to ensure that each of the prediction methods is trained to use locally-optimal parameters); and applying the q different prediction methods obtain q different prediction values (e.g., one-step ahead prediction values): $Y(P, 1)$, $Y(P, 2), \ldots, Y(P, q)$.

Thus, q prediction values may be produced for time point P. From these prediction values, q prediction errors may be computed such that: $E(P, j)=Y(P, j)-X(P)$ where j varies from 1 to q. In various embodiments, these prediction errors may quantify the deviations of the prediction values from their corresponding measured values within S.

Thus, in various embodiments, it is assumed that each of the prediction methods produces one step-ahead prediction errors which are independent and normally distributed, when regarded as random variables. In various embodiments, parameters of the normal distribution may also be determined, including the mean and variance. Furthermore, in various embodiments, the normal distribution and associated parameters may be determined for each of a number of preselected prediction methods.

At operation 408, q prediction error time series of length L (for time points from (P-L) to (P-1) where P is smaller than L) corresponding to the q prediction methods applied in the context on time series S in the past, are extracted. These prediction error time series are the result of the operation 400 for historical time points, i.e., time points older than P.

At operation 410, it is determined whether data point at time point P is anomalous. For example, for a specific prediction method (identified by index j), the prediction errors $E(P-L, j), \ldots, E(P-1, j)$ computed in the past comprise L samples of a normally distributed random variable with mean $\mu(j)$ and standard deviation $\sigma(j)$. A multivariate normal joint probability distribution is then fitted with mean $p=\mu(1), \ldots \mu(j))$ and standard deviation $\sigma=(\sigma(1), \ldots, \sigma(j))$ assuming the q different prediction methods produce independent prediction errors. A distance between each $E(P, j)$ and the fitted multivariate normal joint probability distribution is measured (e.g., using the Mahalanobis distance). If the distances computed exceed a predetermined threshold, the time index P is marked as containing an anomaly.

At operation 412, operations 402 to 410 may then be repeated from time periods P to M.

Figure 6:
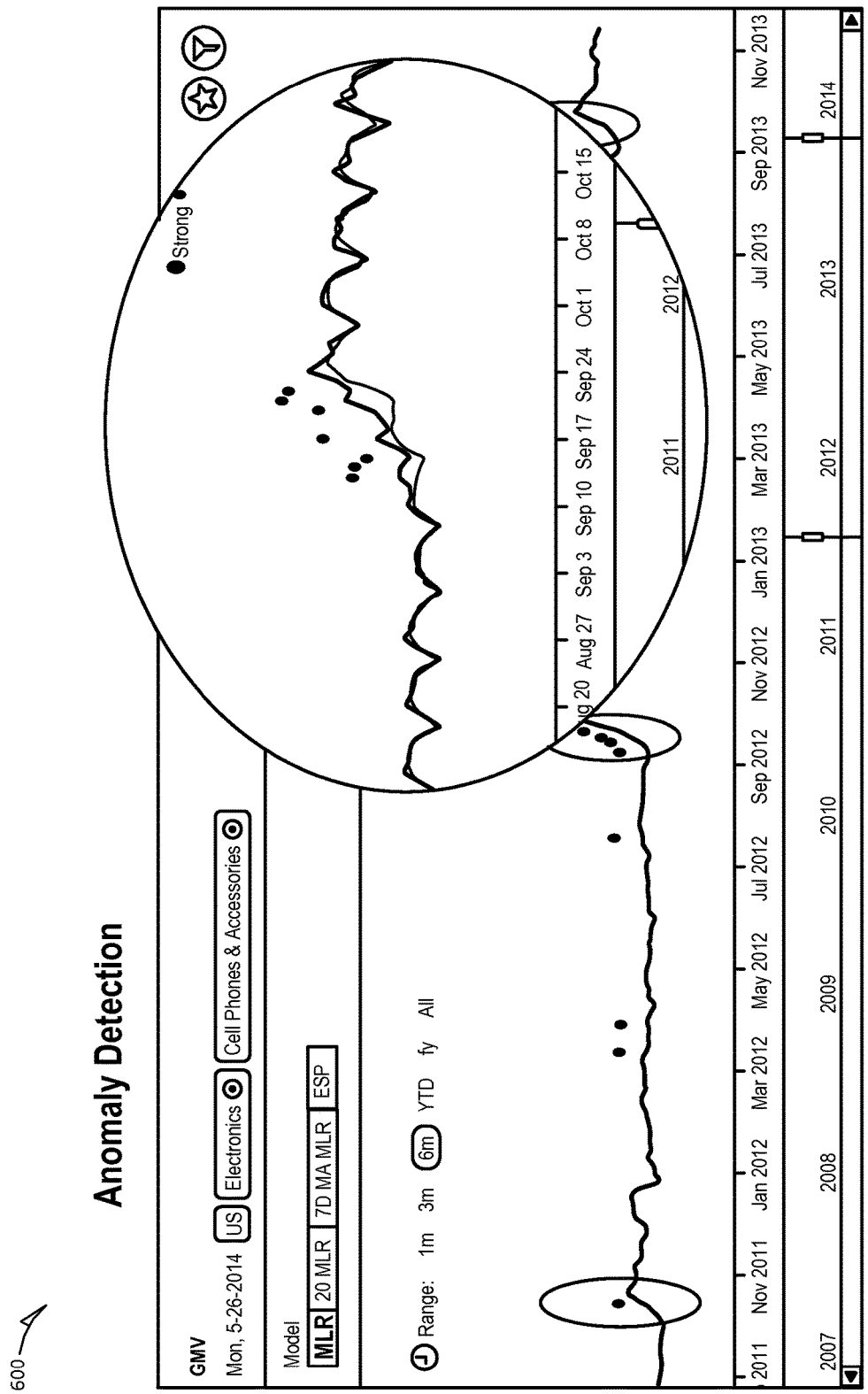
FIG. 6 is an example user interface of a graphical user interface for representing a health of particular computer process executing within a complex system.

At operation 414, a user interface facilitates data exploration and provides a visual indication of whether the data point of interest in the time series S is anomalous. For example, as shown in FIG. 6, the time series data corresponding to a process is presented in a user interface and anomalous data points in the data series are flagged.

Figure 5:
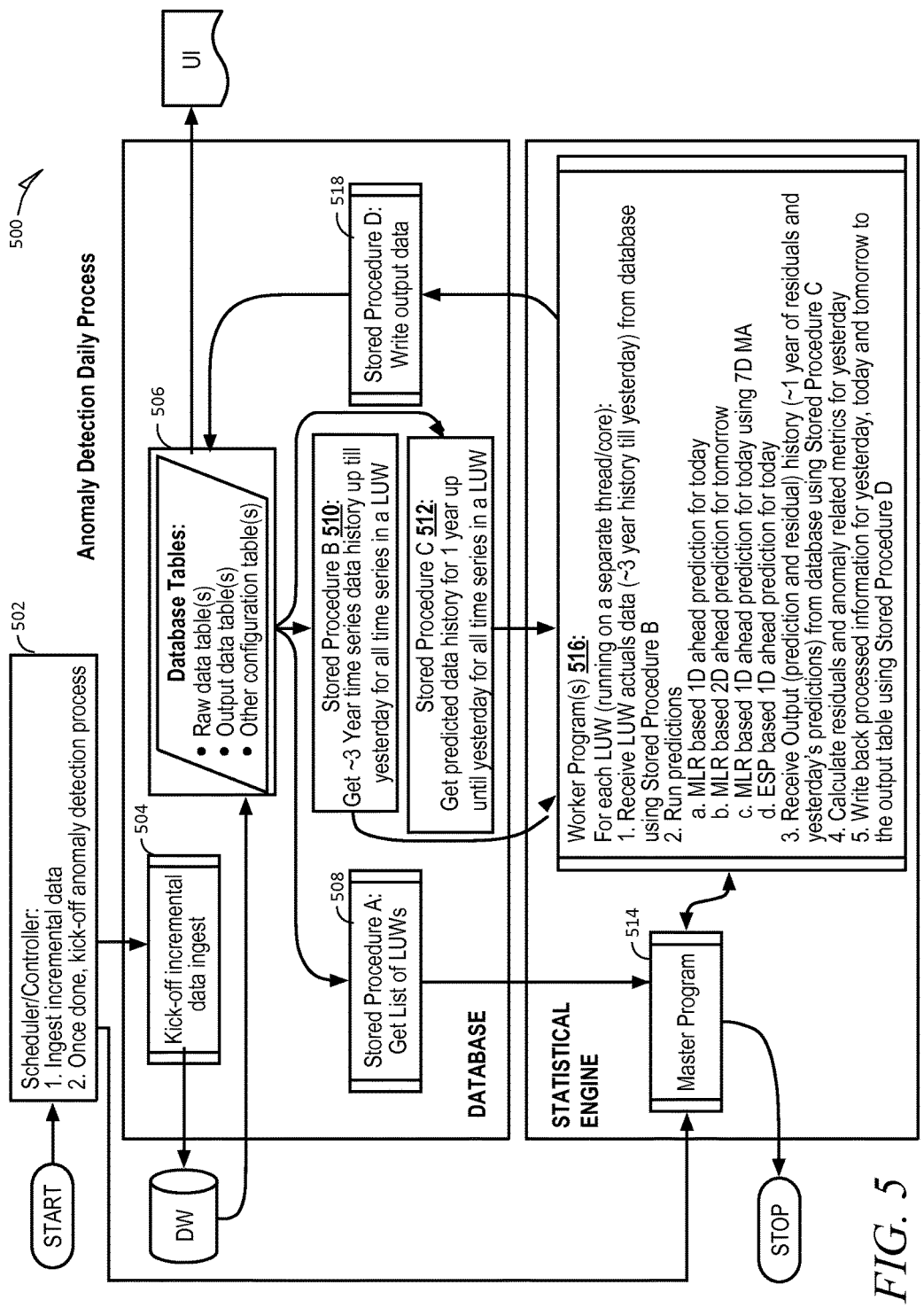
FIG. 5 is a block diagram illustrating an example anomaly detection daily process.

FIG. 5 is a block diagram illustrating an example anomaly detection daily process 500 (the time interval between consecutive time points in this specific embodiment is 1 day). In various embodiments, the anomaly detection daily process 500 may be implemented daily by one or more of the anomaly detection application(s) 152. In this specific embodiment, the process is built to: process millions of time series; accept a data feed from an external data source and append the incremental daily data (pertaining to the latest date for which the time series data are available) to the data source within the embodiment (system); process all the time series and detect whether the latest date appended has anomalies and for which time series. At operation 502, a scheduler/controller application manages (1) kicking off a first process 504 (e.g., a database process) to ingest incremental data and (2) kicking off a second process 514 (e.g., a statistical process) to process the incremental data for anomaly detection.

At operation 506, one or more database tables are accessed or updated with the latest update of incremental daily data. The accessed or updated tables may include raw data, output data already processed by the statistical process at an earlier time period or other (e.g., configuration) information. As a result of this update, all the time series in the embodiment are appended with their respective data elements corresponding to the latest date (the date being processed). These time series are further grouped together into logical units of work (LUWs). A LUW can be defined as a group of individual time series combined together based on some predetermined criteria to be processed together. The criteria could be related to the logic stemming from the nature of the data or it be could a random grouping purely for the purpose of streamlining the amount of data and work passed on to the statistical engine in one request.

At operation 508, according to a first procedure (e.g., stored procedure A), a list of logical units of work (LUWs) are retrieved.

At operation 510, according to a second procedure (e.g., stored procedure B), a first set of data is retrieved which contains the data for all the time series which are a part of a specific LUW (e.g., a 3-year output data history up until yesterday for all time series in a given logical unit of work (LUW)).

At operation 512, according to a third procedure (e.g., stored procedure C), a different set of data is retrieved for all the time series in a specific LUW (e.g., an output data history for 1 year up until yesterday for all time series in a given LUW). The set of data also includes the processed information written at a previous time point for the time series in the LUW of interest by operation 514.

At operation 514, a master program in the statistical engine manages the execution of the anomaly detection procedures for all LUWs. The master program in operation 514 distributes the processing of LUWs across a large number of worker programs such that each worker program processes 1 LUW and runs operation 516 for that LUW independently on an individual processing thread or processing core. The worker program moves on to process the next LUW only once it has finished processing the first LUW.

At operation 516, which is each executed independently on a separate processing thread or processing core, for a given LUW, the worker program(s) receives LUW actuals data (e.g., using stored procedure B, operation 510). Additionally, for each LUW, the worker program(s) run predictions, such as (a) multiple linear regression-based (MLR-based) one-day-ahead prediction for today, (b) MLR-based two-day-ahead prediction for tomorrow, (c) MLR-based one-day-ahead prediction for today using seven-day moving average (MA), (d) a proprietary prediction method, such as EMD-spectral prediction (ESP)-based one-day-ahead prediction for today, (c) or other prediction methods, such as dynamic linear model (DLM), wavelet-based model, empirical mode decomposition (EMD)-based model, or non-stationary ESP model.

Furthermore, the worker program(s) receive previously processed output (prediction and residual) history (e.g., 1 year of residuals) using stored procedure C (operation 512), calculates residuals and anomaly detection related metrics for yesterday, and, at 518, write back processed information for yesterday, today, and tomorrow to the output table using stored procedure D. A graphical user interface may then be generated to visually present the information in the output table (e.g., see FIG. 6).

FIG. 6 is an example user interface 600 of a graphical user interface for representing a health of particular process executing within a complex system, such as the system 100 of FIG. 1. In various embodiments, data points of a time series corresponding to a selected process may be presented in graph. Here, the data points correspond to the gross merchandise volume (GMV) in an e-commerce system in the U.S. for products in an electronics/cell phones & accessories category. A one-day MLR model of data points is displayed over a sixth-month time period. Anomalous data points are flagged (e.g., with a graphical indicator corresponding to the position of the data point within the time series). In various embodiments, the identification of the anomalous data points is based on an analysis of the data points with respect to a combination of a plurality of data models (e.g., the 1-day MLR model, the one-day MLR model on seven-day MA, the two-day MLR model, and a proprietary model, as described above. In various embodiments, the anomalies may be magnified for visual comparison between the actual values and the predicted values. A relative strength of each detected anomaly may also be indicated (e.g., by indicators having different sizes or different colors or different shapes etc. to visually distinguish them based on strength level).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
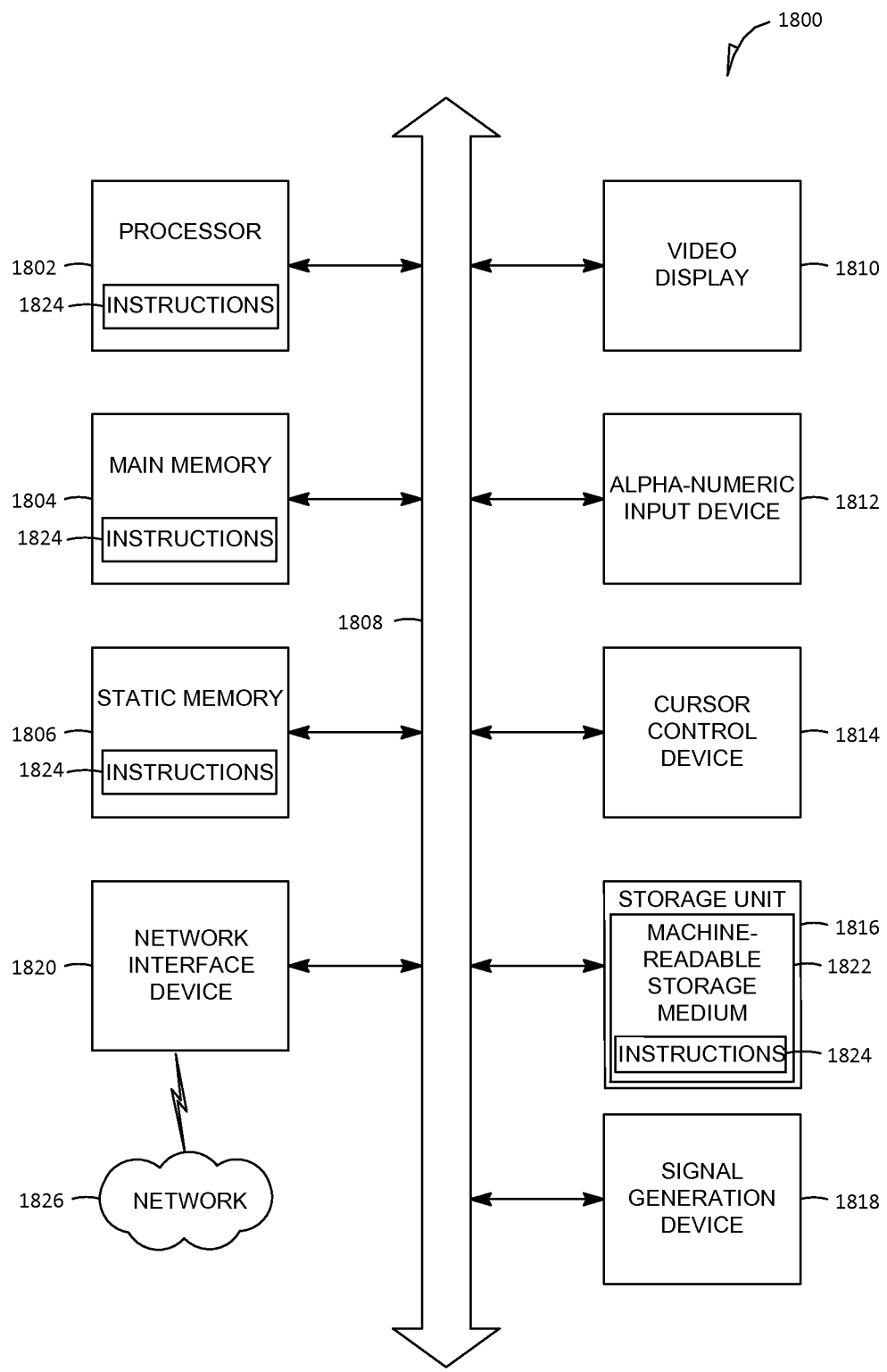
FIG. 7 is a block diagram of machine in the example form of a computer system within which instructions for causing the machine to perform any one or more of the methodologies discussed herein may be executed.

FIG. 7 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

incorporating one or more anomaly detection applications into a computing system, the one or more anomaly detection applications configuring one or more computer processors of the computing system to perform operations for generating a user interface for representing a health of a process executing within the computing system, the operations comprising:

extracting a training tune series corresponding to the process from an initial time series corresponding to the process, the training time series including a subset of the initial time series, the subset of the initial time series having a length offset by an index prior to a last data point of the initial time series;

modifying outlier data points in the training time series based on predetermined acceptability criteria;

training a plurality of prediction methods using the training time series;

receiving an actual data point corresponding to the initial tune series, the actual data point having an index after the last data point of the training time series;

using the plurality of prediction methods to determine a set of predicted data points corresponding to the actual data point of the initial time series;

determining whether the actual data point is anomalous based on a calculation of whether each of the set of predicted data points is statistically different from the actual data point;

receiving an additional actual data point corresponding to the initial time series and extracting an additional training time series having the length offset by an additional index prior to a last data point of the initial time series, the additional index reflecting a relative position of the actual data point to the additional actual data point; and performing the generating of the user interface, the generating including providing a visual representation of the initial time series, the visual representation including a visual identification of the determining of whether the actual data point is anomalous and a visual indication of a determining of whether the additional actual data point is anomalous.

2. The method of claim 1, wherein the calculation of whether each of the set of predicted data points is statistically different from the actual data point includes a determination that the Mahalanobis distance between the prediction error and the fitted multivariate normal joint probability distribution of each of the set of predicted data points is within a specified range.

3. The method of claim 1, further comprising selecting the combination of each of the plurality of prediction methods to minimize a number of false anomaly detections.

4. The method of claim 1, wherein the representing of the determination of whether the actual data point is anomalous including providing a visual indication of a strength of the determination.

5. The method of claim 4, wherein the strength of the determination is based on a number of the plurality of prediction methods that indicate an anomaly with respect to the data point.

6. The method of claim 4, wherein the strength is represented as a size of the visual indication of the strength of the determination of whether the actual data point is anomalous relative to a size of a visual indication of a strength of a determination of whether the additional actual data point is anomalous.

7. The method of claim 1, wherein the training time series represents a window of the initial time series that is recent in relation to the actual data point.

8. The method of claim 1, wherein the generation of the user interface includes providing a magnification element for magnifying a comparison between the actual data point and at least one of the set of predicted data points.

9. A system comprising:
one or more computer processors;
one or more computer memories;
one or more modules incorporated into the one or more computer memories, the one or more modules configuring the one or more computer processors to perform operations for generating a user interface for representing a health of a process executing within a computing system, the operations comprising:
extracting a training time series corresponding to a process from an initial time series corresponding to the process, the training time series including a subset of the initial time series, the subset of the initial time series having a length offset by an index prior to a last data point of the initial time series;
modifying outlier data points in the training time series based on predetermined acceptability criteria;
training a plurality of prediction methods using the training time series;
receiving an actual data point corresponding to the initial time series, the actual data point having an index after the last data point of the training time series;
using the plurality of prediction methods to determine a set of predicted data points corresponding to the actual data point of the initial time series;
determining whether the actual data point is anomalous based on a calculation of whether each of the set of predicted data points is statistically different from the actual data point;
receiving an additional actual data point corresponding to the initial time series and extracting an additional training time series having the length offset by an additional index prior to a last data point of the initial time series, the additional index reflecting a relative position of the actual data point to the additional actual data point; and
performing the generating of the user interface, the generating including providing a visual representation of the initial time series, the visual representation including a visual indication of the determining of whether the actual data point is anomalous and a visual indication of a determining of whether the additional actual data point is anomalous.

10. The system of claim 9, wherein the calculation of whether each of the set of predicted data points is statistically different from the actual data point includes a determination that the Mahalanobis distance between the prediction error and the fitted multivariate normal joint probability distribution of each of the set of predicted data points is within a specified range.

11. The system of claim 9, the operations further comprising selecting the combination of each of the plurality of prediction methods to minimize a number of false anomaly detections.

12. The system of claim 9, wherein the representing of the determination of whether the actual data point is anomalous includes providing a visual indication of a strength of the determination.

13. The system of claim 12, wherein the strength of the determination is based on a number of the plurality of prediction methods that indicate an anomaly with respect to the data point.

14. The system of claim 9, wherein the training time series represents a window of the initial time series that is recent in relation to the actual data point.

15. A non-transitory machine-readable medium comprising a set of instructions that, when executed by one or more processors, causes the one or more processors to perform operations for generating a user interface for representing a health of a process executing within a computing system, the operations comprising:
extracting a training time series corresponding to a process from an initial time series corresponding to the process, the training time series including a subset of the initial time series, the subset of the initial time series having a length offset by an index prior to a last data point of the initial time series;
modifying outlier data points in the training time series based on predetermined acceptability criteria;
training a plurality of prediction methods using the training time series;
receiving an actual data point corresponding to the initial time series, the actual data point having an index after the last data point of the training time series;
using the plurality of prediction methods to determine a set of predicted data points corresponding to the actual data point of the initial time series;
determining whether the actual data point is anomalous based on a calculation of whether each of the set of predicted data points is statistically different from the actual data point;
receiving an additional actual data point corresponding to the initial time series and extracting an additional training time series having the length offset by an additional index prior to a last data point of the initial time series, the additional index reflecting a relative position of the actual data point to the additional actual data point; and performing the generating of the user interface, the generating including providing a visual representation of the initial time series, the visual representation including a visual indication of the determining of whether the actual data point is anomalous and a visual indication of a determining of whether the additional actual data point is anomalous.

16. The non-transitory machine readable medium of claim 15, wherein the calculation of whether each of the set of predicted data points is statistically different from the actual data point includes a determination that the Mahalanobis distance between the prediction error and the fitted multivariate normal joint probability distribution of each of the set of predicted data points is within a specified range.

17. The non-transitory machine readable medium of claim 15, further comprising selecting the combination of each of the plurality of prediction methods to minimize a number of false anomaly detections.

18. The non-transitory machine readable medium of claim 15, wherein the representing of the determination of whether the actual data point is anomalous includes providing a visual indication of a strength of the determination.

19. The non-transitory machine readable medium of claim 18, wherein the strength of the determination is based on a number of the plurality of prediction methods that indicate an anomaly with respect to the data point.

* * * * *

UNITED STATES PATENT AND TRADEMARK OFFICE
CERTIFICATE OF CORRECTION

PATENT NO. : 10,445,644 B2  
APPLICATION NO. : 14/588355  
DATED : October 15, 2019  
INVENTOR(S) : Azadeh Moghtaderi et al.

Page 1 of 1

It is certified that error appears in the above-identified patent and that said Letters Patent is hereby corrected as shown below:

In the Claims

In Column 14, Lines 38-39, in Claim 1, after "training" delete "tune series corresponding to the process from an initial".

In Column 14, Line 39, in Claim 1, after "the" insert -- process from an initial time series corresponding to the --.

In Column 14, Line 49, in Claim 1, delete "tune" and insert -- time --, therefor.

In Column 15, Line 1, in Claim 1, delete "identification" and insert -- indication --, therefor.

In Column 15, Line 17, in Claim 4, delete "including" and insert -- includes --, therefor.

Signed and Sealed this  
Twenty-seventh Day of October, 2020

Andrei Iancu  
*Director of the United States Patent and Trademark Office*